United States Patent
Cui et al.

(10) Patent No.: US 11,125,566 B2
(45) Date of Patent: Sep. 21, 2021

(54) METHOD AND APPARATUS FOR DETERMINING A VEHICLE EGO-POSITION

(71) Applicant: FORD GLOBAL TECHNOLOGIES, LLC, Dearborn, MI (US)

(72) Inventors: Dehua Cui, Northville, MI (US); David A. Herman, Southfield, MI (US); Oleg Yurievitch Gusikhin, West Bloomfield, MI (US); Perry Robinson MacNeille, Lathrup Village, MI (US); David Allen Kowalski, Toledo, OH (US); Omar Makke, Lyon Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 14/800,767

(22) Filed: Jul. 16, 2015

(65) Prior Publication Data
US 2017/0016740 A1   Jan. 19, 2017

(51) Int. Cl.
*G01C 21/30* (2006.01)
*G06K 9/00* (2006.01)

(52) U.S. Cl.
CPC ......... *G01C 21/30* (2013.01); *G06K 9/00671* (2013.01); *G06K 9/00798* (2013.01)

(58) Field of Classification Search
USPC .......................................................... 701/33
See application file for complete search history.

(56) References Cited

U.S. PATENT DOCUMENTS

| | | | |
|---|---|---|---|
| 6,720,949 B1* | 4/2004 | Pryor | A63F 13/02 345/158 |
| 6,775,202 B2* | 8/2004 | Mueller-Dombois | G01V 1/008 340/690 |
| 7,453,217 B2* | 11/2008 | Lys | B60Q 1/2696 315/291 |
| 7,598,686 B2* | 10/2009 | Lys | H05B 33/0815 315/292 |
| 7,788,587 B2* | 8/2010 | Michelman | G06N 3/004 715/734 |
| 7,970,722 B1* | 6/2011 | Owen | G06N 20/00 706/46 |
| 8,112,292 B2* | 2/2012 | Simon | G06Q 50/24 705/3 |
| 8,165,658 B2* | 4/2012 | Waynik | A61B 34/20 600/407 |
| 8,467,956 B2 | 6/2013 | Lee et al. | |
| 8,660,635 B2* | 2/2014 | Simon | G06F 19/3481 600/424 |

(Continued)

FOREIGN PATENT DOCUMENTS

| | | |
|---|---|---|
| CN | 1915725 A | 2/2007 |
| CN | 101004351 A | 7/2007 |
| CN | 102529975 A | 7/2012 |

*Primary Examiner* — Jean Paul Cass
(74) *Attorney, Agent, or Firm* — Michael Spenner; Brooks Kushman P.C.

(57) ABSTRACT

A system includes a processor configured to receive image data gathered by a vehicle camera, relating to a fixed environmental feature. The processor is also configured to determine a vehicle position relative to the fixed environmental feature and determine a vehicle lane-level location on a digital map, based on the vehicle position relative to the fixed environmental feature.

20 Claims, 4 Drawing Sheets

(56) References Cited

U.S. PATENT DOCUMENTS

| | | | | |
|---|---|---|---|---|
| 8,753,195 B2* | 6/2014 | Oakes | G07F 17/326 | 463/17 |
| 8,771,059 B2* | 7/2014 | Oakes | G07F 17/329 | 273/138.1 |
| 8,799,954 B1* | 8/2014 | Ellis | H04N 5/44543 | 725/46 |
| 9,038,103 B2* | 5/2015 | Craner | H04N 21/4826 | 725/37 |
| 9,159,167 B2* | 10/2015 | Tuukkanen | G06F 3/0482 | |
| 9,163,922 B2* | 10/2015 | Bridges | G01B 5/008 | |
| 9,168,654 B2* | 10/2015 | Briggs | B25J 9/0012 | |
| 9,177,434 B2* | 11/2015 | Oakes | G07F 17/32 | |
| 9,190,074 B1* | 11/2015 | LeBeau | G06F 3/167 | |
| 9,223,837 B2* | 12/2015 | Djugash | G06F 17/30554 | |
| 9,229,540 B2* | 1/2016 | Mandella | G06F 3/03545 | |
| 9,305,371 B2* | 4/2016 | Arcas | G06T 11/001 | |
| 9,329,271 B2* | 5/2016 | Ossig | G01S 7/51 | |
| 2004/0128012 A1* | 7/2004 | Lin | G06F 3/011 | 700/100 |
| 2005/0051620 A1* | 3/2005 | DiLuoffo | G06Q 30/06 | 235/382 |
| 2005/0264527 A1* | 12/2005 | Lin | G06F 3/011 | 345/156 |
| 2007/0047816 A1* | 3/2007 | Graham | G06F 16/93 | 382/181 |
| 2007/0162229 A1* | 7/2007 | McCarthy | B60R 1/12 | 701/487 |
| 2007/0208507 A1 | 9/2007 | Gotoh | | |
| 2009/0096870 A1* | 4/2009 | Zheng | B60K 35/00 | 348/148 |
| 2010/0266161 A1* | 10/2010 | Kmiecik | G01C 21/3822 | 382/103 |
| 2012/0089049 A1* | 4/2012 | Suarez | A61B 5/11 | 600/558 |
| 2012/0176411 A1* | 7/2012 | Huston | G06Q 50/01 | 345/633 |
| 2013/0073112 A1* | 3/2013 | Phelan | G06Q 40/00 | 701/1 |
| 2013/0124006 A1* | 5/2013 | Anantha | G06Q 50/01 | 701/1 |
| 2013/0311158 A1* | 11/2013 | Dasari | G01V 99/005 | 703/10 |
| 2014/0096217 A1* | 4/2014 | Lehmann | H04L 63/08 | 726/7 |
| 2014/0218509 A1* | 8/2014 | Kondo | G01C 21/3647 | 348/118 |
| 2014/0222298 A1* | 8/2014 | Gurin | G06F 17/00 | 701/49 |
| 2014/0267415 A1* | 9/2014 | Tang | G06T 11/60 | 345/633 |
| 2014/0278052 A1 | 9/2014 | Slavin et al. | | |
| 2014/0309862 A1* | 10/2014 | Ricci | G01C 21/00 | 701/36 |
| 2015/0006148 A1* | 1/2015 | Goldszmit | G06F 17/275 | 704/8 |
| 2015/0219462 A1* | 8/2015 | Stumper | G01C 21/00 | 701/410 |
| 2015/0248651 A1* | 9/2015 | Akutagawa | G06Q 10/1095 | 705/7.19 |
| 2015/0279389 A1* | 10/2015 | LeBeau | G06F 3/167 | 704/275 |
| 2015/0304406 A1* | 10/2015 | Penilla | G01C 21/26 | 709/203 |
| 2015/0355333 A1* | 12/2015 | Ono | G01S 17/936 | 356/4.01 |
| 2016/0008632 A1* | 1/2016 | Wetmore | A61N 7/00 | 601/2 |
| 2016/0012465 A1* | 1/2016 | Sharp | G06Q 20/18 | 705/14.17 |
| 2016/0019792 A1* | 1/2016 | Kawamata | B60R 16/0236 | 701/70 |
| 2016/0034254 A1* | 2/2016 | LeBeau | G06F 3/167 | 704/275 |
| 2016/0063611 A1* | 3/2016 | Davis | G06F 16/532 | 705/26.63 |
| 2016/0105475 A1* | 4/2016 | Goodman | G06F 3/0487 | 715/753 |
| 2016/0146941 A1* | 5/2016 | Hassenpflug | G01S 17/42 | 356/4.01 |

* cited by examiner

METHOD AND APPARATUS FOR DETERMINING A VEHICLE EGO-POSITION

TECHNICAL FIELD

The illustrative embodiments generally relate to a method and apparatus for determining a vehicle ego-position.

BACKGROUND

Modern vehicle GNSS systems, utilizing current digital maps operating in geodetic coordinates, suffer from accuracy limitations that prevent a wide range of potential navigation features. Typically, a rough approximation of a vehicle location can be obtained using GNSS coordinates determined by an on-board receiver, and then the vehicle location can be "snapped" to a road location on a map. Since this is an approximation of the actual vehicle location, users may notice that they are snapped to the wrong road, for example, when traveling on a road alongside a different road (such as a highway service road alongside a highway).

Also, because of the imprecise nature of the GNSS coordinates, it can be difficult to determine, for example, an exact vehicle location on a multi-lane road. While it may be possible to determine that a vehicle is traveling on a particular road, knowing the exact lane of the vehicle would provide opportunity for directions and driver assistance from a vehicle location (known as ego-position) perspective.

There has been an interest in improving GNSS accuracy for several decades, at least since GNSS was created. Most GNSS devices in vehicles are single band devices because they are much cheaper and less intrusive than two frequency devices that are more accurate. The early GNSS signals were dithered for civilian applications allowing only 100 meter accuracy. In May, 2000 the dithering ended and both military and civilian single band devices could get 10 meter accuracy, making modern automotive navigation devices feasible.

One approach to improving accuracy has been to use differential GNSS where a GNSS receiver is positioned accurately in the geodetic coordinate system and, locating itself with satellite data, determines the errors in the data and transmits corrections to GNSS receivers in the vicinity whose location errors are similar. The most accurate differential GNSS is real-time kinematics (RTK) which provides lane-level accuracy. However, RTK base stations have not been installed extensively on highways and the equipment is still very expensive for retail vehicles.

For specialty vehicles such as automobiles used for creating HD maps GNSS is augmented with inertial guidance (gyrocompass) and LIDAR (laser detection and range) devices. In typical street vehicles GNSS is aided with wheel speed sensors and accelerometer data that is available from the anti-lock brakes and the stability control systems. Sometimes the accuracy of the location computed by the GNSS is improved by translating the vehicle location from the location device to a position on a road in a process called map matching that assumes the vehicle is in fact on a road, and in some cases assumes the vehicle id on a particular road. Utilizing map matching with an ordinary digital map can only locate the vehicle somewhere on the road. When an HD map is used the geodetic coordinates of the individual lanes is known, even though the location device is insufficiently accurate to determine which lane the vehicle is in.

In one present implementation, a method of operation of a navigation system includes: detecting an acceleration for monitoring a movement of a device; determining a travel state based on the acceleration; identifying a travel sequence involving the travel state; setting a lane-level granularity movement as a predetermined sequence of the travel state; and determining the lane-level granularity movement with the travel sequence matching the predetermined sequence for displaying on the device.

In another present implementation, a lane-level vehicle routing and navigation apparatus includes a simulation module that performs microsimulation of individual vehicles in a traffic stream, and a lane-level optimizer that evaluates conditions along the candidate paths from an origin to a destination as determined by the simulation module, and determines recommended lane-level maneuvers along the candidate paths. A link-level optimizer may determine the candidate paths based on link travel times determined by the simulation module. The simulation may be based on real-time traffic condition data. Recommended candidate paths may be provided to delivery or service or emergency response vehicles, or used for evacuation planning, or to route vehicles such as garbage or postal trucks, or snowplows. Corresponding methods also may be used for traffic planning and management, including determining, based on microsimulation, at least one of (a) altered road geometry, (b) altered traffic signal settings, such as traffic signal timing, or (c) road pricing.

SUMMARY

In a first illustrative embodiment, a system includes a processor configured to receive image data gathered by a vehicle camera, relating to a fixed environmental feature. The processor is also configured to determine a vehicle position relative to the fixed environmental feature and determine a vehicle lane-level location on a digital map, based on the vehicle position relative to the fixed environmental feature.

In a second illustrative embodiment, a computer-implemented method includes determining geometric characteristics of a fixed geographic object in an image captured by a vehicle camera. The method also includes determining a vehicle location, relative to the fixed geographic object, based on the geometric characteristics and determining a vehicle lane-level location on a digital map, based on the vehicle location relative to the fixed geographic object.

In a third illustrative embodiment, a system includes a vehicle-embedded camera, configured to capture images relative to a vehicle location and a processor configured to identify fixed geographic objects in the captured images. The processor is also configured to determine a relative distance and angle from one or more of the fixed geographic objects to a vehicle location based on comparison of viewed geometric characteristics of the fixed geographic objects to actual geometric characteristics obtained from a digital map. The processor is further configured to determine a vehicle lane-level location on the digital map based on the relative distance and angle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
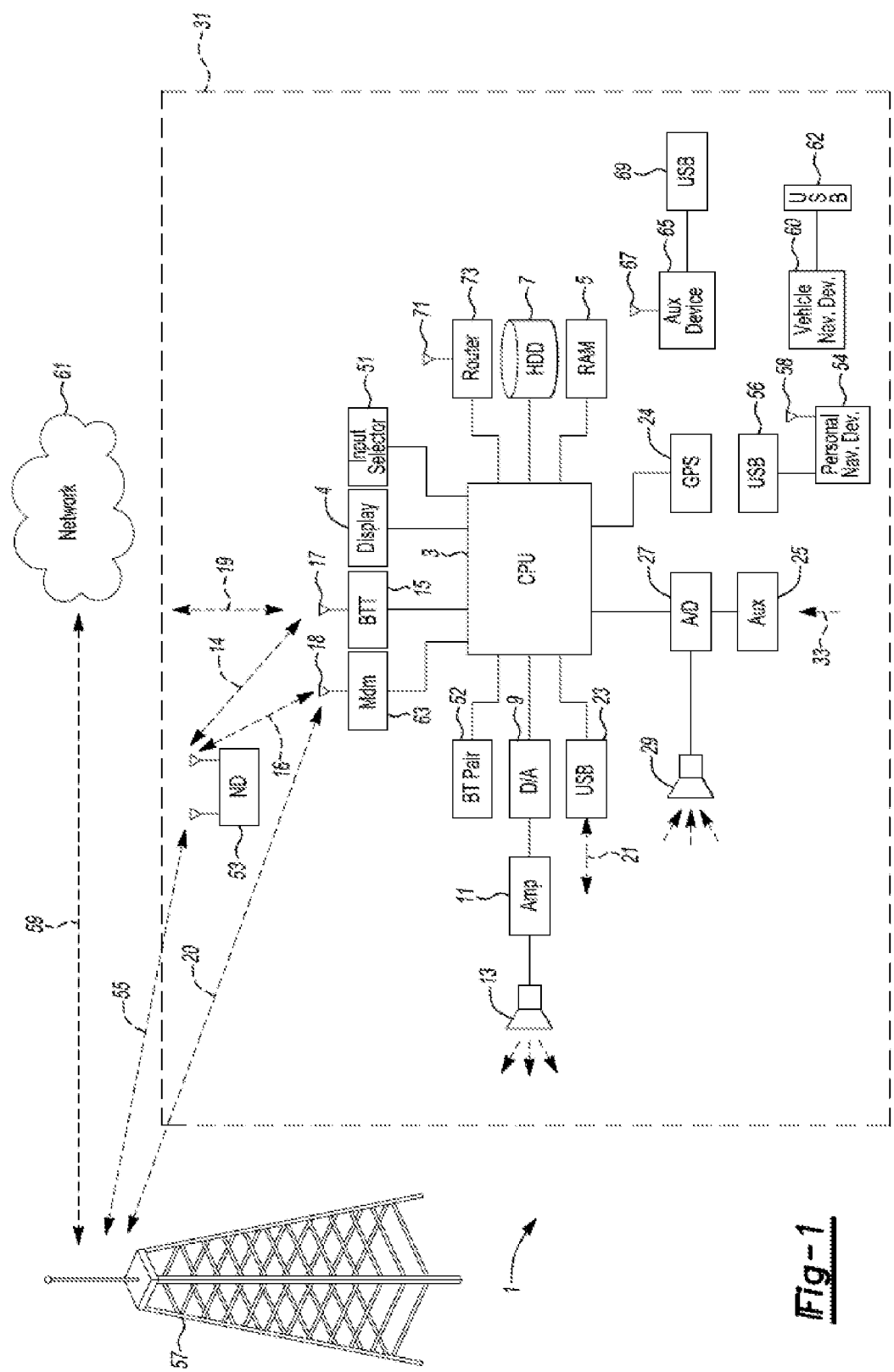
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GNSS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GNSS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

The illustrative embodiments propose a new vehicle positioning system which can achieve vehicle-based lane-level positioning and an ego-lane attribute assessment in a digital map. These two elements enable lane-based navigation advanced driver assistance systems that provide close loop lane level maneuver based assistance such making maneuver suggestions, ensuring maneuver compliance, and predicting maneuvers. This includes, for example, lane change recommendations, lane-level traffic evaluation, lane-level collision avoidance, etc.

Objects located by the map in geodetic coordinates can be first translated into vehicle coordinates using the vehicle's location and orientation from the location system, then into ego-coordinates by knowing the location of the intended occupant.

An illustrative example includes, without limitation, the location of a square in a head's up display that appears to the driver to surround a road sign. The head's up display knows the location to display the square on the windshield from the ego-coordinates of the road sign and the ego-coordinates of the heads-up display surface. In ego-coordinates it is possible to compute the intersection of the ray from the driver's eye to the road sign with the display screen (windshield). The box can be drawn around that intersection point.

By using GNSS positioning systems, context of landmarkings (road lane related features) recognized by a vehicle sensor-suite, the processes can achieve a higher vehicle lateral position. The land markings may serve as detectable structural features on a road. The context of these recognizable features may be used in conjunction with a high definition digital map to better assess vehicle position. Ego-lane attributes in the digital map can be extracted based on lane geometric and topical information of a current road from a digital map. An inference and reasoning algorithm may facilitate a center-meter level of ego-vehicle lateral positioning and an ego-lane index in any multi-lane road, in any location, at any time, regardless of weather, visibility and traffic conditions.

A high-definition map would typically define the road using a series of parametric spline curves. Bezier spline and cubic spline have been used, but cubic spline may be preferred because they go exactly through known points on the road. The splines are C1 continuous and can fully represent vertical and horizontal curvature as well as twist in the road surface. The super-elevation and width of the road can also be represented by spline curves. A certain amount of metadata is also needed such as the number and width of the lanes, speed limits, etc.

In the description, an ego-vehicle refers to a vehicle in which sensors are installed. In this vehicle, positioning and localization may support lane-level navigation assistance. An alternative to this approach may include using high precision GNSS receivers and an extra dedicated high-end ground truthing sensor suite. In the proposed approach, a currently installed OEM front camera module (usable, for example, for lane departure warnings), limited GNSS and installed inertial measurement units facilitate affordable and reliable ego-vehicle lane-level positioning and localization in a variety of environments, including, but not limited to, high occupancy vehicle lanes, high density traffic, varied road conditions and daytime or nighttime driving modes.

Ego-vehicle lane-level positioning in a driving field-of-view may be facilitated by features and events (e.g., without limitation, land markings, land marking types, road types, on-coming and passing traffic, and any other infrastructure feature(s) that can be used for identifying a lane-level location) using recognition based scene camera odometry complemented with low and high rate signals from limited current GNSS and IMU (pitch gyro, electronic stability control, steering angle, and wheel encoders) currently existing on many vehicles. Lane-level vehicle events, such as lane changing, can be used as further lane positioning evidence for ego-vehicle lane-level positioning.

A temporal filtering, such as Kalman filtering, a type of predictor-corrector method, could be used to handle the assimilation of the networks, predicting the moving trajectory of the vehicle, possible intermittency landmark tracking and the legacy of online and/or off-line traffic information servers.

The ego lane localization can be facilitated by ego lane probabilistic localization methodology, which, utilizing Bayesian and/or Dempster-Shafer Theory networks may be used to handle uncertainty, incomplete, and even conflicting scene camera landmark tracking, inaccurate and intermittent GNSS readings, resampling high-rate IMU signals, detailed map data and a diversity of representations of driving and traffic information. A probabilistic recursive filter, such as Kalman filter, multi-hypothesis Kalman filter, Markov filter, or Particle filter (Monti Carlo filter) may be employed for sensor streams processing and the ego lane.

As the result of abovementioned, the ego-vehicle may be localized in a digital map utilizing the ego lane lateral localization with using ego-vehicle positioning and GNSS data. The localization may be used to generate digital ego-lane position and heading usable to extract useful information from a database. Unlike current road-based navigation (where assistance is provided from a road-location perspective as opposed to an actual vehicle lane-level perspective), lane-level resolution of driver and vehicle affecting road data can be retrieved and utilized.

Digital map companies are updating current maps to reflect a high-definition of data observable from a lane-level perspective. This data in conjunction with the proposed vehicle systems can be leveraged to accurately determine a lane-level vehicle position and provide lane-level assistance from a vehicle lane-level perspective. Such maps may contain mathematical or raster definitions of objects on and off the road that are linked to the precise geodetic coordinates of the object. Representation of the objects contains scale information so the range to the object can be estimated by their size in an image. It should also be possible to determine the accuracy of such measurements using the camera geometry, optics and image sensor resolution. Typically the angular resolution of a camera is known and can be used to make this type of estimate.

In addition to being able to detect the ego-position of a vehicle, the proposed embodiments can assist with situational uncertainty through the application of probability theories. For example, the illustrative embodiments can be used to identify a lane-level ego-position when lane markings are obscured or unclear, when lane markings provide conflicting evidence of lane-existence or lane-presence, when a GNSS signal is spotty or map-data is imperfect, when other evidence is lacking, and for the sake of redundancy in confirming other determinations. Modern systems may not support a high confidence location of greater than 5 m, and as such, Lane-level localization via GNSS alone may not be possible.

The illustrative embodiments describe three non-limiting approaches to integrating the noisy output of several sensors to determine the validity of a hypothesis (such as a lane-location)—Fuzzy Logic, Evidence Theory and Bayesian Methods.

In one example, a navigation process may need to know if it should tell the driver to get into a different lane. It is undesirable to give the message if the driver is already in that lane (from a driver distraction perspective), but it's not dangerous or incorrect.

An example of a hypothesis might be "Am I in lane 3?", and an answer might be the likelihood of being in lane 3 is 10%. Evidence theory approaches sensor outputs differently than Fuzzy Logic or Bayesian Methods. Sensor output is referred to as "information" and it is expected to be noisy. The philosophy is more related to rules of evidence in a theory of knowledge than direct statistical or classification approach.

Figure 2:
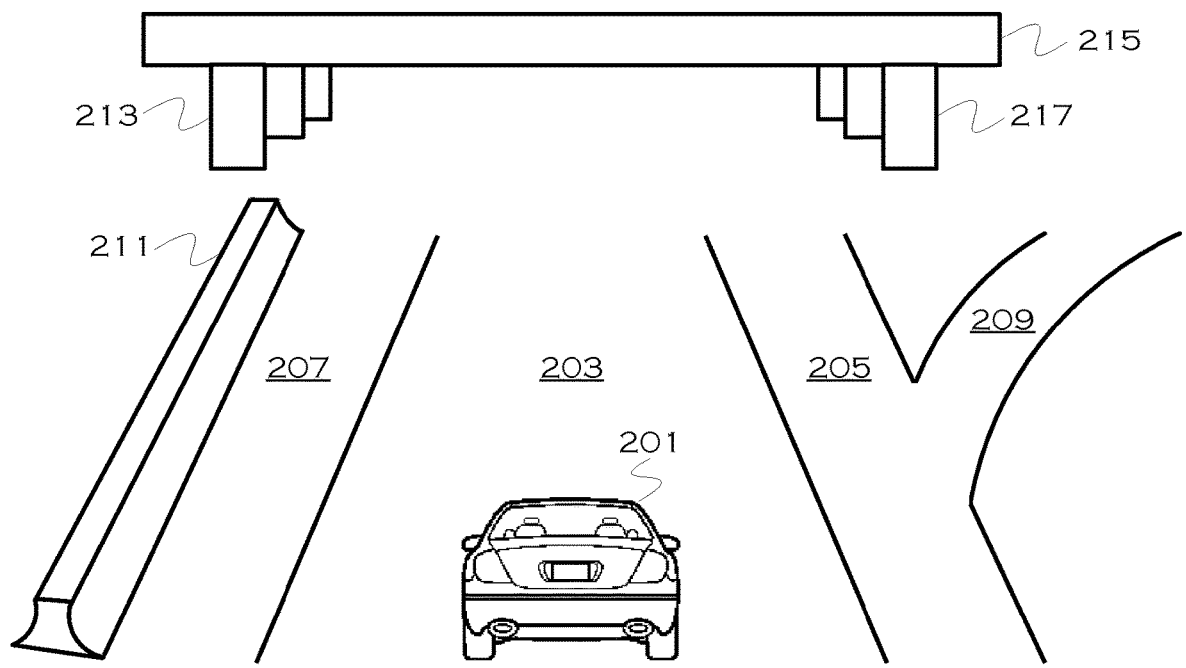
FIG. 2 shows an illustrative example of a vehicle and environment.

FIG. 2 shows an illustrative example of a vehicle and environment. In this illustrative example, the ego vehicle (the vehicle hosting the vision sensors) 201 is traveling on a S-lane highway. Each lane 203, 205, 207 is separately definable in a digital map. The markings dividing the lanes are one persistent feature observable by ego machine vision sensors and are usable to identify the ego vehicle positioning related with the ego lane.

Also, in this example, a number of landmarks are present that could be viewed by a vehicle camera or detected by sensors and correlated with a high definition map. The landmarks include data such as divider data 211, bridge pier 213 and 217 on either side of a highway, bridge 215 and off-ramp 209. The location of various bridge components are known precisely and stored in the HD map. The CAD drawings and site survey may be sources of this precise information. The distance between the bridge soffit and the pile cap would be known from HD map, and the angle between them would give the range to the bridge. The angle between the first and last pier in the center on the camera image compared to that angle on the right would give a measure of the lane the vehicle is in. Once the lane is known, the lane lines can be tracked for considerable distance. By viewing and gathering this data, and comparing the data to a high definition map, in conjunction with vehicle GNSS coordinates and other data if needed, a reasonably reliable projection of a vehicle lane-level location can be determined. These lane-level locations will also be useful for autonomous vehicles, which will likely need to make decisions based on a particular lane of travel, or based on even more-precise positioning.

Figure 3:
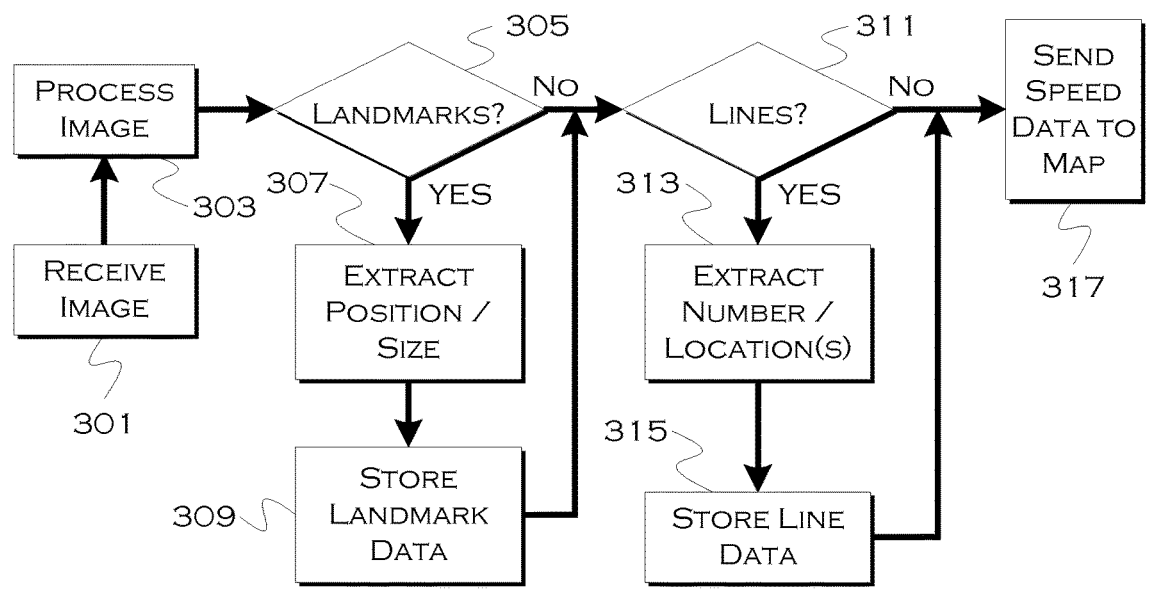
FIG. 3 shows an illustrative example of an environmental data gathering process.

FIG. 3 shows an illustrative example of an environmental data gathering process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, vehicle cameras and sensors provided in many vehicles on the road today are usable to gather data to be compared to a high definition digital map. In conjunction with the additional map data available on a high definition digital map, these landmark and road feature identifications can result in a reasonable determination of a vehicle lane-position. Once this refined location is obtained, a whole advanced array of driver navigation assistance can be provided.

In this illustrative process, an image from a vehicle camera is received 301 for processing 303. Based on a processing of the image, any potential landmarks may be identified 305. Since landmark heights, sizes, shapes, etc. may be known, it is possible to determine a distance from various landmarks based on a viewed size versus an actual size. Thus, position data and size data of landmarks can be identified in a picture, leading to an understanding of the vehicle relational position with respect to these landmarks, based on actual landmark size. Data relating to these landmarks can then be stored for comparison to a high definition digital map. The actual landmark size, for example, can be used to determine a scaled size in the image, which can then be used to determine the distance to the feature. Also, an offset angle between a vehicle heading and the feature can be determined, so that the vehicle position relative to the feature can be determined.

Also in this example, any road data, such as dividing lines 311 can be extracted from a viewed scene. The number of identifiable dividing lines and the relative locations of those lines can be extracted from the image 313. Since the lines may be a fixed width apart, this information can be used to determine the distance of a vehicle from various lines and landmarks (having lines between the landmarks and the vehicle). The extracted line data may also be stored for comparison to a high-definition digital map 315. Once a lane-level vehicle location is determined, the lane markings are also useful in determining whether a vehicle has changed lanes, for example, if an series of images shows a lane marking moving under a vehicle location in the image from left-to-right or vice versa. Also, for the sake of understanding, although a vehicle may not actually appear in an image, the vehicle location in the image is the perspective point from which the image originates, as the vehicle camera takes the image. This "location" could also be adjusted slightly based on the actual location of the camera on the vehicle (e.g., if the camera was on the far left, there may be a virtual offset to represent the actual location of the center of the vehicle).

Traffic data may also be extracted from the scene. The traffic data can provide the location of on-coming and same-direction traffic, which can be used to identify lane-existence (i.e., a vehicle traveling in the same direction but to the left or right of a current direct heading probably means that a lane exists to the left or right; an oncoming vehicle to the left probably means the vehicle is in the leftmost lane of a current road; etc.). Distances to the various traffic elements can also be determined and used in lane-level navigation assistance.

All data extracted and stored from the scene snapshot or image can be then sent to a processing algorithm for use in conjunction with a high definition digital map, providing an understanding of what was "seen" in the camera image 317. Determining, for example, viewed angles between objects can require some calculation about the centers of objects, since objects in 3 dimensional space have depth and width. With sufficient map data, however, all the "real world" dimensional and location-based characteristics of objects can be known, and comparisons can be made to center-lines (determinable from the dimensional characteristics) or, for example, to edge locations of the objects (also determinable, and possible also known from the high definition maps). For example, with respect to a building, the actual geographic boundaries of the building may be known (i.e., the north west corner of the building is at X, Y). With respect to smaller objects, such as bridge pier, the center location of the pier may be known, and the geometry of the pier may be known, such that a determination that a pier edge geographic determination can be made based on known pier dimensions and a known pier axis location.

Figure 4:
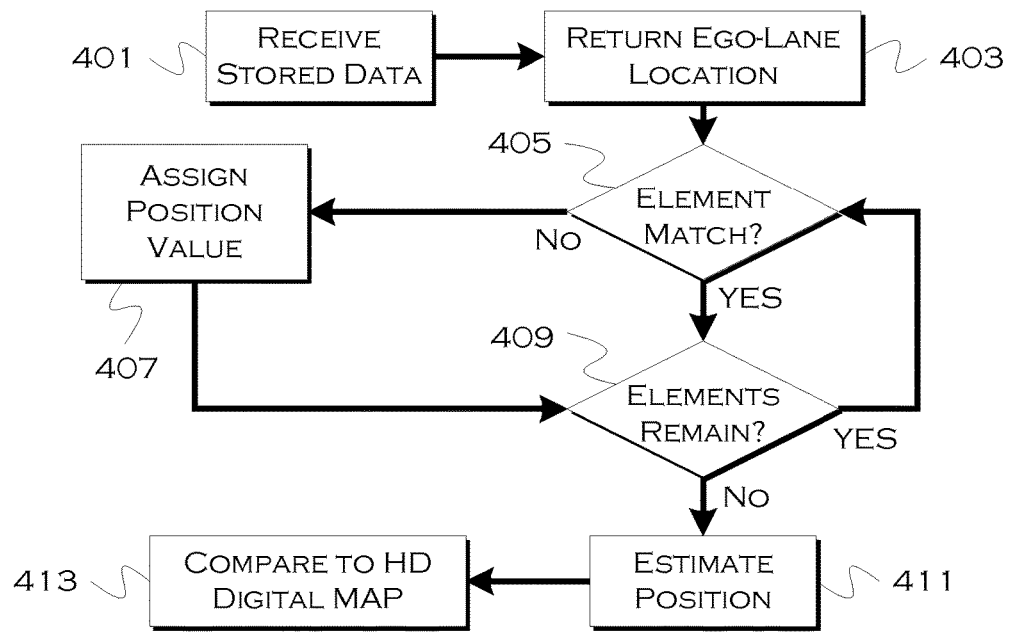
FIG. 4 shows an illustrative example of a vehicle position determining process.

FIG. 4 shows an illustrative example of a vehicle position determining process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives data stored from one or more camera scenes, showing the "view" from a vehicle front, in this example 401. This data, identifying, for example, landmarks, traffic and lane markings, can be compared to a digital map 403 for extracting of comparable features present on the digital map.

For example, in the scene shown in FIG. 2, the lane markings, dividing barrier and bridge with supports may all be identified on the digital map. If the bridge is 14 feet high, and the vehicle horizontal angle and camera angle are known, it is possible to determine how far from the bridge the vehicle is based on simple geometry (i.e., two angles and a side height, 14 feet, are known, so if 3 inches in the image represents 14 feet between the road and bridge, then the distance of the vehicle in inches from the bridge can be determined which can be extrapolated to distance in feet). Similar distances from other landmarks can be calculated, and thus a vehicle relative position to the landmarks can be determined. Since the landmarks are typically fixed in location, the actual vehicle position can be determined based on the relative position.

Lane markings can assist in vehicle position determination and/or be used to confirm a projected lane-level position.

For each element of the scene that corresponds to an element on the HD map 405, a relative position value of the vehicle can be determined 407, until no identifiable elements remain 409. From this information, a fairly precise vehicle lane-level position can be estimated 411. This position can be returned 411 to an advanced driver assistance module (or other suitable recipient) for lane-level ego-vehicle perspective guidance.

Figure 5:
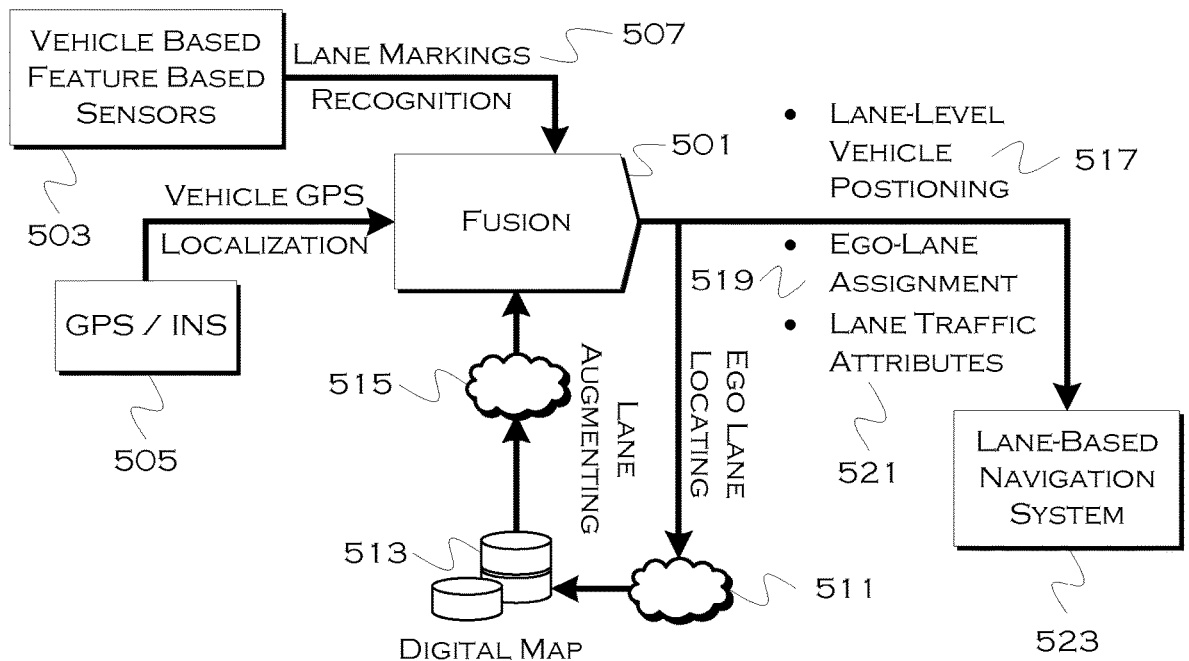
FIG. 5 shows an illustrative example of a lane position determination system.

FIG. 5 shows an illustrative example of a lane position determination system. In this illustrative embodiment, GNSS/INS coordinates 503 provide a general location of a vehicle 507. Vehicle based sensors and cameras 505 can view an ego-vehicle perspective scene and the viewed lane markings, landmarks and traffic 509 can be sent for processing. A fusion module 501 which fuses the various available data can send a request to the cloud 511 for use of a high definition digital map database 513. Here, the cloud then performs data-analysis to determine the lane-level location of the vehicle 515, which is returned to the fusion engine. In another example, the localized digital map data may be returned for on-board processing if such capabilities are provided to the vehicle.

Resulting from the fusion of known data, a lane-level position 517 can be determined, as well as an ego-lane assignment 519 usable in advanced navigation assistance. Also, lane-based traffic flow and attributes 521 can be provided and/or determined. All of these determinations are usable by a lane-based navigation assistance module 523 to provide a new level of driver assistance.

Figure 6:
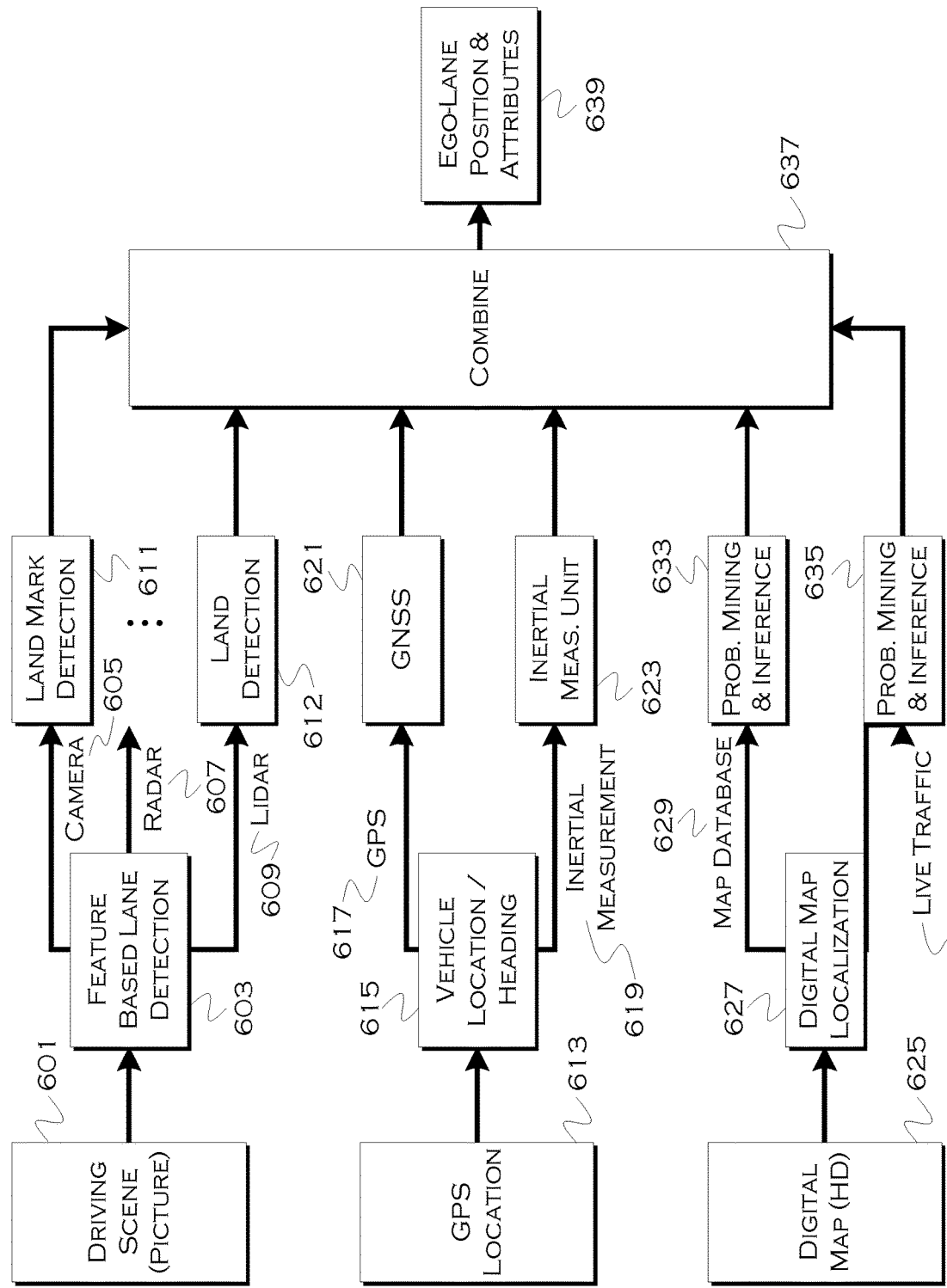
FIG. 6 shows illustrative inputs and processing for ego-position determination.

FIG. 6 shows illustrative inputs and processing for ego-position determination. In this illustrative example, a number of combinatorial inputs are provided for the purpose of determining an ego-vehicle lane-level position, among other things. Here, a driving scene captured by a vehicle camera 601 provides feature-based lane detection 603. Data gathered by this portion of the system includes, but is not limited to, camera data 605, RADAR data 607, LIDAR data 609, etc. This data provides the capabilities for landmark detection 611, feature based lane detection 612 and other similar determinations.

GNSS data 613 is also usable by this system, to determine a general vehicle location and heading 615. A GNSS receiver 617 can provide GNSS coordinates 621. An inertial measurement unit 619 can provide inertial measurements 623.

Another input to the system is a digital map 625, which can include, but is not limited to, a digital map. This can provide digital map localization assistance 627. The data includes data pulled from a digital map database 629 which provides an opportunity for a location probability inference (using the scene data, for example). Also, a live traffic server can provide localized traffic data 631, which may be usable for another location probability inference 635.

All of these data inputs can be combined 637 in a meaningful fashion to determine a probabilistic vehicle lane-level location and local attributes 639. This resulting information is usable by advanced lane-level navigation assistance systems to provide a more defined level of driver assistance.

A location probability inference as to which lane in which a vehicle is traveling may be based on, for example, without limitation, lane location evidence, level 2-3 data (information, context), from distributed multiple vision sensor modules (such as front camera, radar, and lidar modules, etc. that have their own information processing to retrieve the lane related information with uncertainty such as lane marking in lane departure warning module), digital map, GNSS with variation distribution, and other vehicle sensor suite with variation (IMU, gyro, vehicle dynamic sensors which can be used in the recursive lane localization, the prediction of next vehicle position based on current vehicle position).

The evidence engine may apply a suitable statistical model and probabilistic inference theory to deal with the evidences (such as-Bayes rule can be applied for known prior knowledge of sensor evidences like IMU, Dempster rule can be applied on camera sensor with confidence ranges (belief and plausibility due to classification uncertainty and scenery uncertainty), GNSS sensor data variation can be treated with Gaussian, and Map Data uncertainty can be treated with fuzzy logic). The inference engine will map/associate evidences from different sources to its hypothesis space with belief and plausibility, associated with the plausibility of each sensor as the weights in the inference. The resulting conclusion will provide a statistical likelihood that a vehicle is traveling in a particular lane, which can be compared to a confidence threshold to determine if the inference that the vehicle is in the given lane is high enough to utilize the information as if the vehicle is "known" to be in the particular lane.

For example, sensor 1, short range radar, reports vehicle in lane 1 with 70% confidence, while sensor 2, front lidar module detects vehicle NOT in lane 2 with 80% confidence, sensor 3, GNSS sensor, detects vehicle' longitude and horizontal position with the variation of Gaussian distribution, and sensor 4, camera, does not detect any evidence. The inference engine will associates the evidence degree of belief with the multiple hypotheses, such as vehicle in each lanes lane 1, lane 2, 3, with relief and plausibility. The information will be used for lane-based navigation guidance.

Although discrete examples are provided with respect to camera-viewed objects, it is to be understood that the proposed embodiments employ a variety of information in approaches to integrating the noisy output of several sensors to determine the validity of a hypothesis. Thus, information from an entire vehicle sensor suite may be used in any given approach, in order to perfect a hypothesis or increase a degree of certainty with regards to a specific location.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive image data gathered by a vehicle camera, relating to a fixed environmental feature;
determine a real-world vehicle position relative to the fixed environmental feature; and
determine a vehicle lane-level road location on a digital map, including the environmental feature, based on the real-world vehicle position relative to the fixed environmental feature, transitioned on to the digital map.

2. The system of claim 1, wherein the processor is configured to determine a distance between a vehicle and the fixed environmental feature based at least in part on actual feature size compared to viewed feature size in the image data.

3. The system of claim 2, wherein the actual feature size is obtained from the digital map.

4. The system of claim 1, wherein the processor is configured to determine a distance between a vehicle and the fixed environmental feature based at least in part on angular resolution of the vehicle camera.

5. The system of claim 1, wherein the processor is configured to determine a distance between a vehicle and the fixed environmental feature based at least in part on actual size and location of elements of the fixed environmental feature, and a relative viewed-angle in the image data between these elements.

6. The system of claim 5, wherein the processor is configured to determine a vehicle lane-location on the digital map based on a comparison of different viewed-angles, one to the left and one to the right of a vehicle in the image data, between elements of the fixed environmental feature.

7. The system of claim 1, wherein the processor is further configured to extract lane-markings from the image data and utilize the lane markings to determine if a vehicle changes lanes following the determination of the lane-level location.

8. The system of claim 1, wherein the determination of the vehicle position relative to the vehicle feature includes determination of a distance between the vehicle and the feature, a vehicle orientation and an offset angle between a vehicle heading and the feature.

9. A computer-implemented method comprising:
determining geometric characteristics of a fixed geographic object in an image captured by a vehicle camera;
determining a real-world vehicle location, relative to the fixed geographic object, based on the geometric characteristics; and
determining a vehicle lane-level road location on a digital map, including the geographic object, based on the real-world vehicle location relative to the fixed geographic object, transitioned on to the digital map.

10. The method of claim 9, wherein the geometric characteristics include an angle between a vehicle heading and the fixed geographic object.

11. The method of claim 9, wherein the geometric characteristics include a distance to the fixed geographic object, based at least in part on the angle between the vehicle heading and the fixed geographic object.

12. The method of claim 9, wherein the geometric characteristics include an angle between two elements of the fixed geographic object, wherein the geographic location of each of the two elements is obtainable from a digital map.

13. The method of claim 9, wherein the geometric characteristics include a scale of the fixed geographic object, based on a known height of the fixed geographic object compared to a viewed height in the image.

14. The method of claim 13, wherein the geometric characteristics include a distance to the fixed geographic object, based at least in part on the scale of the fixed geographic object.

15. The method of claim 9, further comprising determining geometric characteristics of a plurality of fixed geographic objects, on either side of a vehicle location in an image, and determining the vehicle location based at least in part on a comparison of the determined geometric characteristics of the plurality of fixed geographic objects.

16. The method of claim 15, wherein the determining geometric characteristics includes determining a viewed-angle between a first and second object to the left of the vehicle location, and between a third and fourth object to the right of the vehicle location, the geographic location of all four objects obtainable from a digital map.

17. A system comprising:
a vehicle-embedded camera, configured to capture images relative to a vehicle location; and
a processor configured to:
identify fixed geographic objects in the captured images;
determine a real-world relative distance and angle from one or more of the fixed geographic objects to a vehicle location based on comparison of viewed geometric characteristics of the fixed geographic objects to actual geometric characteristics obtained from a digital map; and
determine a vehicle lane-level road location on the digital map based on the real-world relative distance and angle, transitioned on to the digital map.

18. The system of claim 17, wherein the processor is configured to identify lane markings in the captured image and to associate a line of lane markings to the left or right of the vehicle with a current vehicle lane, based on the lane-level location.

19. The system of claim 18, wherein the processor is configured to determine that the line of lane markings is passing under a vehicle in a series of images in a direction from a first vehicle side to a second vehicle side.

20. The system of claim 19, wherein the processor is configured to determine a new lane level location as one lane over from a previous lane level location, in the direction of the first vehicle side.

* * * * *